United States Patent [19]

Spencer

[11] 4,398,287
[45] Aug. 9, 1983

[54] DIGITAL SWITCHING OVER PAM BUS SYSTEM

[75] Inventor: Douglas A. Spencer, Boulder, Colo.

[73] Assignee: Bell Telephone Laboratories, Incorporated, Murray Hill, N.J.

[21] Appl. No.: 298,381

[22] Filed: Sep. 1, 1981

[51] Int. Cl.$^3$ .......................... H04J 3/02; H04Q 11/04
[52] U.S. Cl. .......................................... 370/85; 370/67
[58] Field of Search .......................... 370/85, 67, 86, 6

[56] References Cited

U.S. PATENT DOCUMENTS 3,652,800 3/1972 Dooley .................................. 370/67
3,934,091 1/1976 Stidham ................................... 370/6

OTHER PUBLICATIONS

IBM Technical Disclosure Bulletin, vol. 18, No. 1, Jun. 1975, pp. 11–13, "Automatic Zero Correction Technique".

Primary Examiner—Douglas W. Olms
Attorney, Agent, or Firm—H. R. Popper

[57] ABSTRACT

In a PAM bus switching bus which normally handles analog voice signals, the different DC offsets caused by the different buffing, summing and distribution amplifiers cause no ill effects because DC voltages are not passed by the remainder of the support elements. However, when it is attempted to switch logic level DC signals through such a PAM bus network, the DC offset which is an indeterminate function of the particular switching path established, makes it impossible to establish a uniform slicing level. In the illustrative embodiment a uniform slicing level is achieved by clamping the summing bus of the PAM system during a preamble of the time slot, measuring the offset on the distribution bus and then applying the measured offset to compensate the distribution bus during the remainder of the time slot when the actual data signal is allowed to be applied to the summing bus.

9 Claims, 3 Drawing Figures

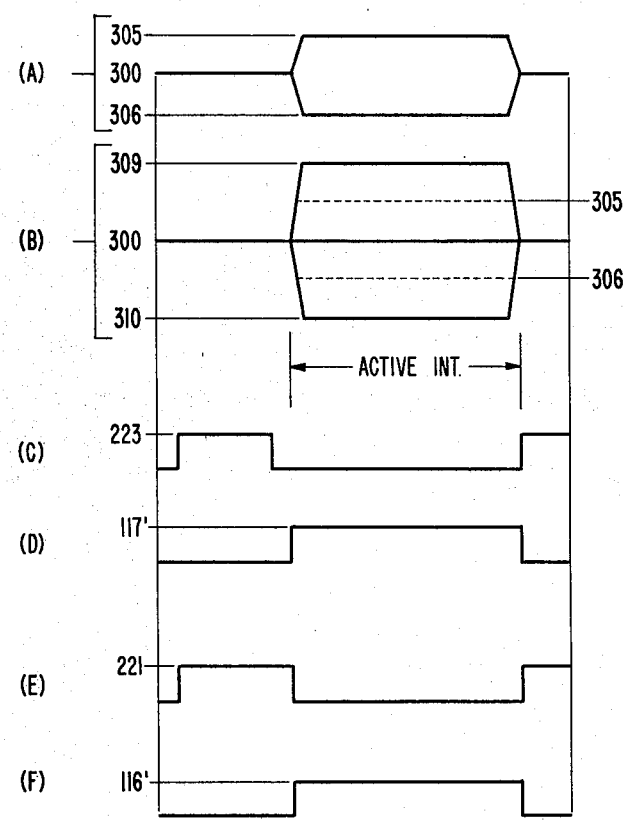

DIGITAL SWITCHING OVER PAM BUS SYSTEM

BACKGROUND OF THE INVENTION

1. Field of the Invention

This invention relates to digital switching systems and more particularly to the switching of digital signals through a PAM (pulse amplitude modulated) bus network.

2. Description of the Prior Art

A well known prior art private branch exchange uses a PAM bus network to establish voice frequency connections among pluralities of lines and trunks. Some of the different kinds of connection paths that can be established in such a PBX are illustrated in U.S. Pat. No. 3,934,091 entitled "Automatic Gain Compensation in Time Division Switching System" issued to James R. Stidham on Jan. 20, 1976. Different amplification or gain factors are present on line-to-line, line-to-trunk and trunk-to-line connections. The gain that is provided when a voice connection is made between two lines appearing in the same line carrier (where they are served by the same line summing amplifier input for the PAM bus) is somewhat different than the gain provided when the connection is made between two lines that appear in different line carriers (where each line is served by a separate input of the line summing amplifier).

In that prior-art system, the voice ports assigned to lines and trunks are sampled by the PAM bus at approximately twice the Nyquist rate, i.e., at approximately 16.2 kHz, so that simpler passive filters can be employed than would be required if these ports were sampled at the conventional Nyquist rate. Since this sampling rate exceeds the conventional data modem transmission rates of 1.2, 2.4, 4.8 and 9.6 kilobaud, the possibility presents itself of applying the digital data stream directly to the PAM bus, i.e., without employing a modem to first have the data stream modulate a voiceband carrier signal and to then apply the composite signal to the PAM bus. While modems might still be required to perform the usual modulation, wave shaping, and equalization processes when the digital data transmission path extends beyond the PBX, if modems could be eliminated on intra-PBX calls the total number of modems required at a PBX could be reduced by the ratio that intra-PBX data traffic bears to total data traffic.

When digital data signals are received it is generally necessary to determine whether the received signal level corresponds to a "1", to a "0", or to some other predetermined signal level. For example, if a positive voltage of some magnitude is intended to signify a "1" and a negative voltage is intended to signify a "0", the zero-voltage level is the obvious threshold or "slicing" level upon which to base the decision of what the signal means. In the above-mentioned PAM bus system, however, the DC output level delivered by the PAM bus to the called port circuit varies depending upon the particular connection path that may have been established through the network on the particular call. This variation in DC level is of no consequence on a voice connection because an analog voice signal has no DC component. The DC offset in the PAM bus network is present because each of the buffer amplifiers employed in the PAM bus system contains a deliberate DC offset (approximately 50 millivolts) for the purpose of mitigating crossover distortion. Crossover distortion is caused when an analog amplifier employs separate transistor amplifier sections for handling positive and negative input signals. When the input signal changes polarity a transition is made from one amplifier section to the other. To avoid having this transition take place at very low signal levels, which might lead to uncertainty as to which (or both) sections would be operative, a deliberate DC offset is employed so that one set of amplifiers will handle all low level signals without regard to polarity.

While the nominal DC offset level produces no ill-effects in voice communications, the normal variation in the nominal level exhibited by different combinations of such summing amplifiers means that the ultimate DC voltage output level cannot accurately be predicted. When additional stages of switching, each including a buffer amplifier, are added to the aforementioned type of switching system to accommodate greater numbers of lines and trunks, the gain (and output level) on each voice connection from an original source port to a final destination port will also vary according to the number of summing amplifiers included in the connection. Accordingly, it would be advantageous to establish a uniform DC output level on the distribution bus so that a predictable slicing level for digital signals could be achieved regardless of the particular connection path that may be taken through the PAM bus network on any call.

SUMMARY OF THE INVENTION

I have discovered that a uniform DC slicing level can be established by clamping the summing input to the PAM bus during a predetermined preamble fraction of each time slot and by measuring the voltage which then appears on the distribution output from the PAM bus. This measurement is the actual DC offset present on the particular connection that has been established for the call during the time slot. During the active interval of the time slot, when the actual data signal is applied to the summing input of the PAM bus, the DC offset level determined during the preamble fraction of the time slot is applied to a compensation circuit associated with the distribution output of the PAM bus. The DC reference level for digital data signals thereby becomes uniform and predictable and is independent of the particular connection path established. Advantageously the preamable portion of the time slot so employed may comprise part of the normal guard interval that precedes the active portion of the time slot.

BRIEF DESCRIPTION OF THE DRAWING

The foregoing and other objectives and features of my invention may become more apparent from the ensuing detailed description and drawings in which:

FIG. 3 shows wave forms occurring during a time slot assigned for digital data transmission when the arrangement of FIG. 2 is employed in the system of FIG. 1.

DETAILED DESCRIPTION

Figure 1:
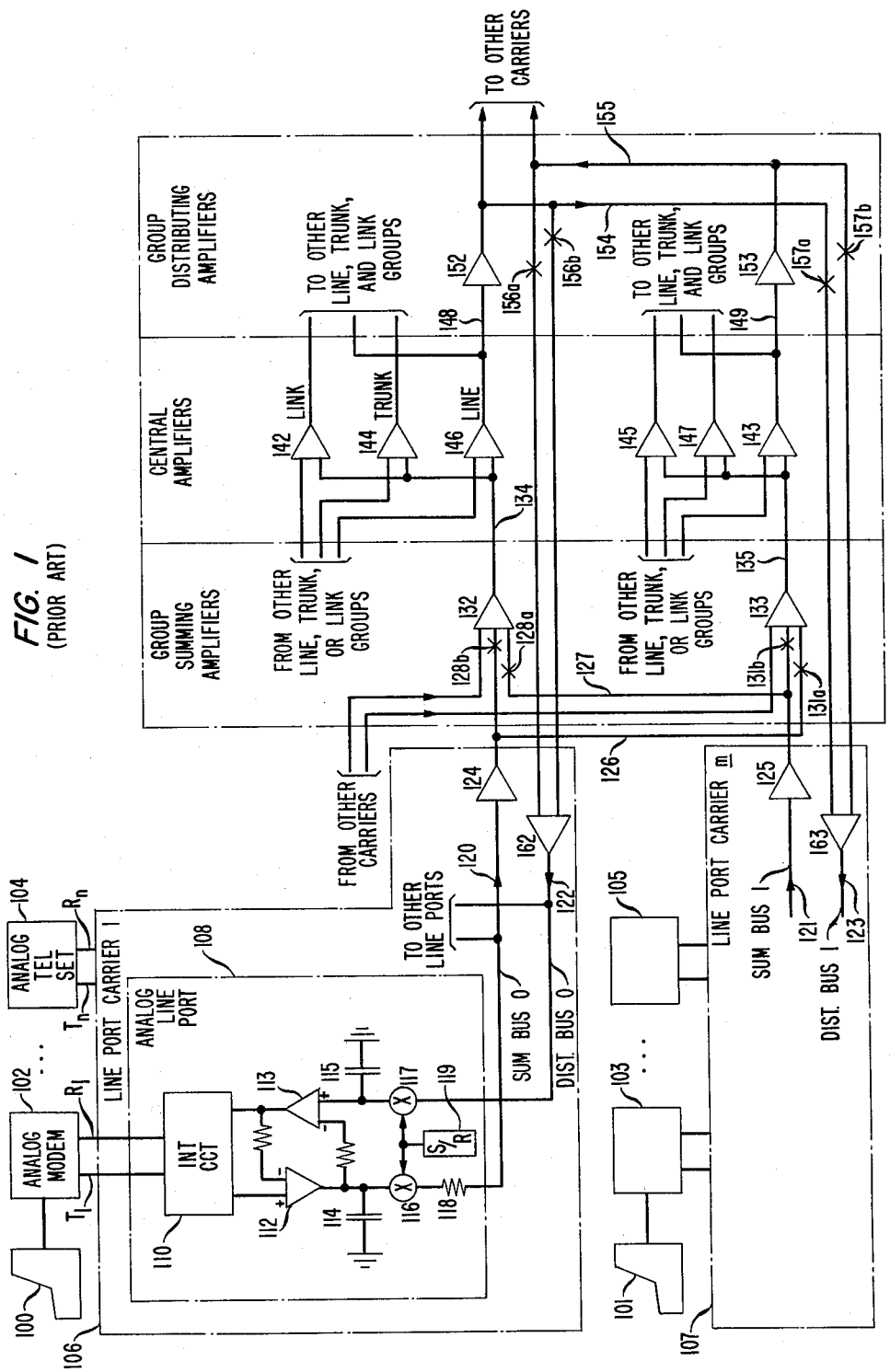
FIG. 1 shows a block diagram of a prior art PAM bus switching system employing a plurality of buffer amplifiers and interbus switches.

A large prior art switching system employing pulse amplitude modulated (PAM) buses and five levels of summing, buffering and distribution amplifiers is shown in FIG. 1. The switching system permits the establishment of local analog voice connections among a large plurality of telephone lines, trunks, and links. A telephone set, such as analog telephone set 104, is served by a respective analog line port which is mounted in a line port carrier 106 of the PBX switching equipment. Each analog line port such as port 108 has a 128 bit recirculating shift register 119 which may be instructed by a central processor (not shown) to store a bit that operates transmit time slot switch 116 and receive time slot switch 117 during a particular one of 64 time slots available to the sum and distribution buses 120, 122 serving the line port carrier. A time slot lasts approximately 1 microsecond.

Each analog port 108 includes an interface circuit 110 such as that shown in J. M. Elder, Jr. U.S. Pat. No. 3,934,099 issued Jan. 20, 1976 and an active hybrid arrangement. The active hybrid has a transmit section and a receive section. The transmit section includes operational amplifier 112, outgoing sample capacitor 114, and transmit time slot switch 116. The receive section includes receive time slot switch 117, receive sample capacitor 115, and receive operational amplifier 113.

During the time slot assigned to port 108, recirculating shift register 119 simultaneously activates both transmit time slot switch 116 and receive time slot switch 117. The time slot recurs at a 16.2 kHz rate. When transmit time slot switch 116 is closed, the voltage on outgoing sample capacitor 114 is delivered through summing resistor 118 to summing bus 120. When receive time slot switch 117 is closed, the voltage on distribution bus 122 is applied to incoming sample capacitor 115. The voltage on capacitor 115 is conveyed by amplifier 113 via interface 110 to tip and ring conductors T1, R1, and the signal on the tip and ring conductors is conveyed via interface 110 and amplifier 112 to capacitor 114.

Another line port carrier 107 has access to a different group of 64 time slots. For example, line port carrier 106 normally has access to the 64 time slots of distribution bus 0 over a path including carrier summing amplifier 124, bus routing switch 128b, group summing amplifier 132, central buffer amplifier 146, group distributing amplifier 152, switch 156b and carrier distributing amplifier 162. If all of the time slots of distribution bus 0 are busy, line port carrier 106 may be accorded access to the 64 time slots of distribution bus 1 via a path including intramodule bus 126, and bus routing switch 131a, group summing amplifier 133, central buffer amplifier 143, group distributing amplifier 153, switch 157b and carrier distributing amplifier 163. Line port carrier 107 has normal access to the time slots of distribution bus 1 and alternate access, via intramodule bus 127 and bus routing switch 128a, to the set of 64 time slots of distribution bus 0. A group of line, link and trunk port carriers having access to an overlapping group of 128 time slots is called a module.

A certain percentage of the calls originated by line port carriers 106 and 107 will be intramodule calls. These calls will be completed either over a path involving central buffer amlifier 146 associated with distribution bus 0 or via central buffer amplifier 143 associated with distribution bus 1. Outgoing calls from the module will usually be capable of completion over a path including either central trunk amplifier 144 or 147. However, when all of the trunks in the groups associated with central amplifiers 144 or 147 are busy, a link path may be established via central link amplifiers 142 or 145 to the trunk groups (not shown) serving some other module (not shown). If 1/m percent of the calls can be handled within a given module, then m−1/m percent of the calls will involve a link connection made through the use of a second module.

The communications paths that may so be established will typically traverse five different amplifier stages and may be carried over different sets of intermodule switches. For example, a connection from the tip and ring conductors Tn, Rn of analog telephone set 104 to analog telephone set 105 may be carried from the line port (not shown, but similar to analog line port 108) serving set 104 to summing bus 120 and then by line carrier summing amplifier 124, line group summing amplifier 132, central buffer amplifier 146, line group distributing amplifier 152, intramodule bus 154, bus routing switch 157a, line carrier distributing amplifier 163 and distribution bus 123 to the line port (not shown, but similar to analog line port 108) serving telephone set 105. Alternatively, the connection could have been made via summing bus 120, summing amplifier 124, intramodule bus 126, switch 131a, amplifiers 133, 143, 153, switch 157b, amplifier 163 and distribution bus 123. Each of the aforementioned paths will exhibit a different DC offset. Summing, buffer and distributing amplifiers each typically exhibit a slew rate of 10 volts per microsecond and a DC offset of 50 millivolts. The port time slot switches 116, 117 and the routing switches 128a, b; 131a, b; 156a, b; and 157a, b each exhibits a nominal DC offset of 25 millivolts. Summing buses 120, 121 are designed to handle a maximum analog signal amplitude of 5 volts with 0.3 dB compression; 5 volts corresponding to an equivalent of +10 dBm at the tip and ring conductors T, R.

So long as analog voice connections are being made the different DC offsets have no noticeable effect. Even when digital data is to be switched, the indeterminate DC offset level is of no consequence so long as analog modems are employed. The analog modem shapes the digital data stream and then modulates a carrier to place the resultant signal in the nominal 3 kHz voice frequency band.

In addition to the different accumulation of DC offset voltages that occurs when different connection paths established through the PAM bus network, different amplifier gains are deliberately employed on different kinds of connections. These different gains are dictated by the insertion connection loss standards for the various types of analog connections. For example, to provide loss contrast between line-to-line connections within the PBX and line-to-trunk connections going out of the PBX, the transmission loss on line-to-line connections is set at −5 dB whereas line-to-trunk connections have a transmission loss of zero dB. In an illustrative installation the peak signal voltage level on the PAM distribution bus for a line-to-trunk connection may be approximately 935 millivolts, for a trunk-to-line connection approximately 1212 millivolts, and only 752 millivolts for a line-to-line connection. It can therefore readily be appreciated that when an unmodulated digital data signal having a zero voltage reference is attempted to be switched through the PAM bus network, the accumulated DC offsets can be an appreciable fraction of any of the different peak signal levels dictated by the different amplifier gains on the different kinds of connections.

Figure 2:
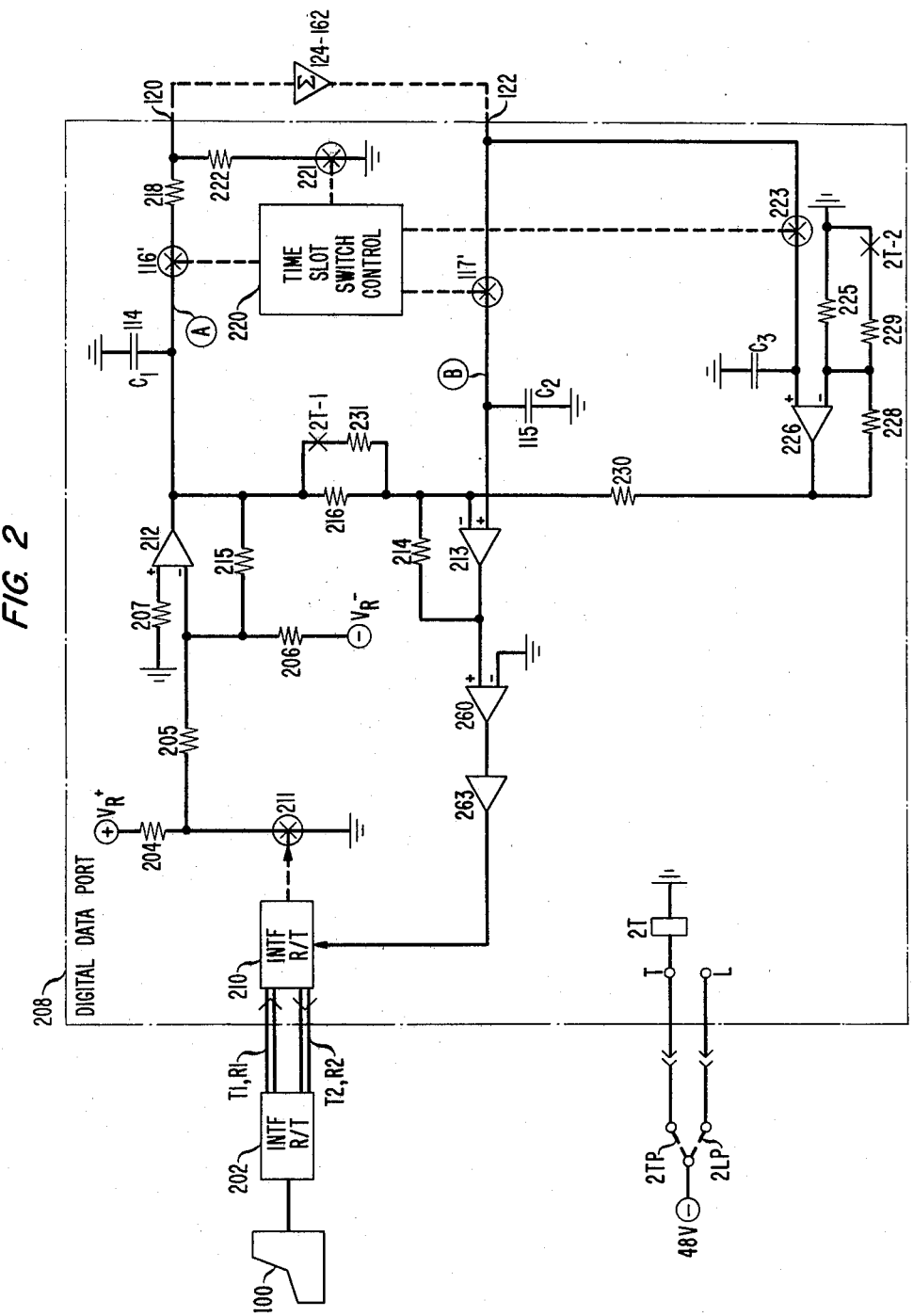
FIG. 2 shows the circuitry of my invention including modified buffer amplifiers for the switching system of FIG. 1 so that a uniform slicing level for digital data signals is achieved.

In FIG. 2, a modification to the circuitry of FIG. 1 illustrates a digital data port arrangement for overcoming the uncertainty in slicing threshold. Digital data port 208 may be employed in FIG. 1 either in a line port carrier such as line port carrier 106 or in one of the trunk port carriers. When inserted in a line port carrier, conventional 48 volt battery is applied to port 208 via back plane pin connection path 2LP, and when inserted into a trunk port carrier, 48 volt battery is applied via path 2TP. In the latter case, relay 2T is operated, closing its contacts 2T-1 and 2T-2, the purpose of which will hereinafter be described.

Assuming for the moment that digital data port 208 is serving a line associated with a data terminal 100 shown at the left, the data terminal 100 will be connected to digital data port 208 over a 4-wire path T1, R1, and T2, R2 via interface receiver/transmitter circuits 202, 210. Interface circuit 202 is physically located adjacent to data terminal 100 and simply converts the logic level data stream from terminal 100 to a bipolar signal for transmission over conductors T1, R1 and converts bipolar signals received over conductors T2, R2 to logic level signals for delivery to terminal 100. Interface circuit 202 advantageously need contain no apparatus for causing the data signal to modulate a voiceband carrier. Interface circuit 210 is physically located adjacent to the PBX switching equipment and performs the corresponding bipolar signal to logic level signal conversions. Interface circuit 210 also controls the opening and closing of switch 211 in accordance with the digital data stream received from terminal 100 over conductors T1, R1. Switch 211 is associated with the inverting input of transmit operational amplifier 212.

Digital data port 208 includes a pair of transmit and receive operational amplifiers 212, 213 which are located in respect of summing and distributing buses 120, 122 in generally the same fashion as transmit and receive operational amplifiers 112, 113 of the analog port of FIG. 1. Thus, the output of transmit operational amplifier 212 is connected to summing bus 120 over a path involving outgoing sample capacitor 114, transmit time slot switch 116' and summing resistor 218. Time slot switch 116' samples the voltage on capacitor 114 and applies it to summing bus 120. Receive time slot switch 117' samples the voltage on distribution bus 122 and applies it to incoming sample capacitor 115 at the non-inverting input of receive amplifier 213. Switches 116' and 117' occupy positions on buses 120 and 122 generally corresponding to the switches bearing the same but unprimed reference numbers in FIG. 1. Outgoing sample capacitor 114, outgoing summing resistor 218 and incoming sample capacitor 115 occupy similar positions to the correspondingly numbered devices of FIG. 1.

Briefly, in prior art FIG. 1, switches 116 and 117 were both closed for the entire active interval of the time slot interval. As shown in waveform (A) of FIG. 3, the time slot of the prior art system is divided into three intervals, an active interval, when switches 116 and 117 are both closed and guard intervals which precede and follow the active interval. For example, the active interval lasting 625 nanoseconds follows a preliminary guard interval of 200 nanoseconds and in turn is followed by a trailing guard interval of 175 nanoseconds. However, in accordance with one aspect of my invention, new switches 221 and 223 are provided which open and close as shown at waveforms (E) and (C). The purpose of these new switches will be explained shortly.

Switch 211, which opens and closes in step with the digital data stream received from terminal 100, is connected to potential divider 204, 205, 206 lying between positive voltage reference source $V_R+$ and equal-magnitude but opposite-polarity reference source $V_R-$. Voltage divider 204, 205, 206 and switch 211 apply a signal at the inverting input of amplifier 212 such that amplifier 212 will apply a voltage to summing bus 120 when switch 211 is open (data "0") that will be equal in magnitude but opposite in polarity to the voltage applied when switch 211 is closed (data "1"). This condition establishes a symmetrical data "eye" on summing bus 120. In order to establish the symmetrical data eye, the values of voltage divider resistors 204, 205, 206 and of feedback resistor 215 should be related to each other according to the following expression:

$$\frac{R215}{R206} = \frac{V_{CI}}{V_R} \text{ and } \frac{R215}{R204 + R205} = \frac{2}{V_R} V_{CI}$$

where
R204 is the resistance of resistor 204
R205 is the resistance of resistor 205
R206 is the resistance of resistor 206
R215 is the resistance of resistor 215,
$V_{CI}$ is the peak signal voltage on capacitor 114 and
$V_R$ is the absolute magnitude of voltage reference $V_R$.

The above relationships may be derived as follows:
When Switch 211 is closed, (logic "1")

$$+V_R \frac{R215}{R206} = +V_{CI} \text{ thus } \frac{R215}{R206} = \frac{V_{CI}}{V_R}$$

When Switch 211 is open, (logic "0")

$$-V_R \frac{R215}{R204 + R205} + V_R \frac{R215}{R206} = -V_{CI}$$

Substituting from above and dividing both sides by $V_R$ results in $$\frac{-R215}{R204 + R205} + \frac{V_{CI}}{V_R} = \frac{-V_{CI}}{V_R} \text{ or } \frac{R215}{R204 + R205} = \frac{2V_{CI}}{V_R}$$

Amplifier 212 will apply a voltage of $+V_{CI}$ volts to capacitor 114 when switch 211 is closed, and $-V_{CI}$ volts when switch 211 is opened by time slot switch control 220. The magnitude of $V_{CI}$ should be such that an equivalent signal level of 0 dBm would appear at the tip and ring conductors at the remote port circuit (not shown in FIG. 2) but corresponding to port circuit 208 and located at the called end of the data connection and receiving the data signal from distribution bus 122 transmitted by terminal 100. The symmetrical data eye established on summing bus 120 would be conveyed to distribution bus 122 by the PAM bus switching network of FIG. 1 indicated by the composite amplifier symbol 124–162 shown dotted, if the amplifiers and switches of the PAM network exhibited no DC effect. Since these amplifiers and switches do exhibit DC effects which accumulate in different ways depending on the actual amplifiers and switches brought into use on a given connection, it is necessary to compensate for the DC offsets so that a symmetrical data eye can be recovered from bus 122.

Waveform (A) of FIG. 3 shows a symmetrical data eye that occurs on summing bus 120 where level 305 corresponds to transmission of a logic "1" and level 306 corresponds to transmission of a logic "0". Waveform (B) shows a data eye that would occur on distribution bus 122 under full duplex conditions. Level 309 occurs when the port circuits at each end of a data connection simultaneously transmit logic "1" signals while level 310 occurs when both port circuits transmit logic "0" signals. Level 300 occurs when one port circuit transmits a logic "1" signal and the other port circuit transmits a logic "0" signal.

To compensate for the accumulated DC voltage offset occasioned by the varying characteristics of the amplifiers and switches that may be encountered between summing bus 120 and distribution bus 122 different connection paths (generally indicated by the dotted amplifier 124–162) time slot switch control 220, in addition to controlling outgoing and incoming time slot switches 116' and 117' as shown in waveforms (F) and (D) of FIG. 3, also controls two additional time slot switches, 221 and 223. Time slot switch 221 is closed earliest during a first portion of the normal guard interval as shown in waveform (E) of FIG. 3. During this "preamble" interval, outgoing time slot switch 116' is not yet closed as shown in waveform (F). When switch 221 is closed, summing bus 120 is connected to standard reference (ground) through resistor 222. During this preamble interval, whatever DC offsets are accumulated by amplifiers and switches 124–162, together with any noise that is picked up on the PAM bus system, appear on summing bus 122.

Time slot switch 223 is closed during most but, advantageously, not all of the preamble interval that switch 221 is closed. During the time that switch 223 is closed the accumulated offset voltage (and any noise voltage) that appears on distribution bus 122 will be applied to capacitor C3 at the non-inverting input of differential amplifier 226. When switch 223 is opened switch 117' is closed but switch 221 remains closed briefly until the start of the active interval. Switches 116' and 117' then remain closed for the duration of the normal active interval when both are opened for the duration of the normal trailing guard interval.

The voltage at the output of compensating amplifier 226 is delivered to the inverting input of receive operational amplifier 213 through resistor 230. The voltage level so delivered will be subtracted by amplifier 213 from whatever signal level amplifier 213 would otherwise develop at its output due to the signal applied at its non-inverting input. The signal applied at the non-inverting input of amplifier 213 normally consists of three components, the desired signal incoming on distribution bus 122 from the remote end (not shown) of the digital connection, the accumulated DC offset, and a "side-tone" component that is desirable when analog speech is being carried but which is not desired when digital signals are present. Elimination of digital side-tone will be explained shortly.

When switch 223 is opened, as shown in waveform (C) of FIG. 3, the accumulated DC offset voltage remains on capacitor C3. Amplifier 226 continues to apply this offset voltage to the inverting input of amplifier 213 during the remainder of the time slot. When switch 117' is closed during the active interval of the time slot the incoming digital signal from distribution bus 122 is applied to capacitor C2 at the non-inverting input of amplifier 213. The voltage applied to capacitor C2 will include not only the desired digital signal but also the accumulated DC offset and noise, as well as the side-tone component. Because the DC offset had priorly been ascertained on capacitor C3 during the preamble interval and continues to be applied by amplifier 226 to the inverting input of amplifier 213 during the remainder of the time slot, amplifier 213 develops at its output a digital signal free of DC offset and the noise component also accumulated on capacitor C3 while switch 223 was closed.

In the prior art hybrid comprising amplifiers 112 and 113, a resistive path was provided between the output of transmit amplifier 112 and the inverting input of receive amplifier 113 in order to subtract out all but the side-tone component of the talker's speech sample that is returned to the sender from the distribution bus. In FIG. 2 a resistive path from the output of transmit amplifier 212 to the inverting input of receive amplifier 213 is provided by resistor 216 (if Switch 2T-1 is open) to subtract out the sender's signal level that is returned to the sender from distribution bus 122. Since no side-tone component would normally be necessary on a data connection, resistor 214 and 216 may advantageously adjust the inverting gain of amplifier 213 to subtract out the entire transmitted signal level of amplifier 212 that is returned by bus 122 to the non-inverting input of amplifier 213.

For cancellation of accumulated offsets, the voltage gain from bus 122 via crosspoint 223 and the positive input of compensating amplifier 226 to the output of amplifier 213 must offset the gain from bus 122 via crosspoint 117' to the output of amplifier 213. Accordingly, when switches 2T-1 and 2T-2 are open:

$$\frac{R214}{R230}\left(\frac{R228}{R225}+1\right) = 1 + \frac{R214}{R216} + \frac{R214}{R230}.$$

When switches 2T-1 and 2T-2 are closed:

$$\frac{R214}{R230}\left(1 + \frac{R228(R225 + R229)}{R225\ R229}\right) =$$

$$1 + \frac{R214(R216 + R231)}{R216\ R231} + \frac{R214}{R230}.$$

Also, the gain provided up to the output of amplifier 213 for the digital "side-tone" introduced via R216 from point (A) to the inverting input of amplifier 213 must equal the gain from point (A) through the PAM bus amplifiers 124–162 to point (B) at the non-inverting input of amplifier 213. Accordingly, when switch 2T-1 is open:

$$G_{AB}\left(1 + \frac{R214}{R230} + \frac{R214}{R216}\right) = \frac{R214}{R216}$$

and when switch 2T-2 is closed:

$$G_{AB}\left(1 + \frac{R214}{R230} + \frac{R214(R216 + R231)}{R216\ R231}\right) =$$

-continued $$\frac{R214(R216 + R231)}{R216\, R231},$$

where GAB is the voltage gain from point (A) to point (B) via amplifiers 124–162.

When relay 2T is operated, its contact 2T-1 inserts resistor 231 in parallel with resistor 216 to raise the gain of amplifier 213. This is required because GAB is higher when a trunk is involved in a connection because the gain in the central trunk amplifier 144 is conventionally set at a higher value than the gain of central line amplifier 146. Correspondingly, when relay 2T is operated, its contact 2T-2 inserts resistor 229 in parallel with resistor 225 to raise the gain of amplifier 226.

The foregoing is illustrative of one embodiment of my invention. Further and other modifications may be made by others skilled in the art without, however, departing from the spirit and scope of the principle of my invention.

What is claimed is:

1. An arrangement for establishing a uniform slicing level in a PAM bus time division switching system serving a plurality of ports and including means for defining a repetitive sequence of time slots, a summing bus for receiving a signal sample from one of said ports and a distribution bus for delivering said signal sample to one of said ports during each of said time slots, comprising
    means for clamping said summing bus to a reference potential during a predetermined preamble portion of each of said time slots,
    means for measuring the voltage appearing on said distribution bus during each said time slot preamble,
    differential slicing means having an input connected to said distribution bus, and
    means controlled by said measuring means for adjusting the slicing level of said slicing means during the remainder of each said time slot.

2. An arrangement according to claim 1 wherein said means for measuring includes sample and hold means connected between said distribution bus and an inverting input of said differential slicing means.

3. A digital data port for connection to a summing and distribution bus, said port having a transmit and a receive operational amplifier, a transmit time slot switch operable to connect the output of said transmit operational amplifier to said summing bus and a receive time slot switch operable to connect an input of said receive operational amplifier to said distribution bus, a clamping time slot switch operable prior to the operation of said transmit time slot switch for clamping said summing bus and a compensating time slot switch operable during the time said clamping time slot switch is operated for connecting said distribution bus to another input of said receive operational amplifier.

4. A digital data port for connection to a summing and distribution bus, said port having a transmit and a receive operational amplifier, a transmit time slot switch operable to connect the output of said transmit operational amplifier to said summing bus and a receive time slot switch operable to connect an input of said receive operational amplifier to said distribution bus, a clamping time slot switch operable prior to the operation of said transmit time slot switch for clamping said summing bus, a sample and hold circuit, and a compensating time slot switch operable during the time said clamping time slot switch is operated for connecting said sample and hold circuit between said distribution bus and an inverting input of said receive operational amplifier.

5. A digital data port for connection to a summing and distribution bus, said port having a transmit and a receive operational amplifier, a transmit time slot switch operable to connect the output of said transmit operational amplifier to said summing bus and a receive time slot switch operable to connect the non-inverting input of said receive operational amplifier to said distribution bus, side-tone suppression means connecting the output of said transmit operational amplifier to an inverting input of said receive operational amplifier, clamping time slot switch means operable prior to the operation of said transmit time slot switch for clamping said summing bus, and compensating time slot switch means operable during the time said clamping time slot switch means is operated for connecting said distribution bus to said inverting input of said receive operational amplifier.

6. A digital data port according to claim 5 wherein said compensating time slot switch means includes means for storing throughout the duration of the remainder of one of said time slots a signal sample appearing on said distribution bus when said clamping time slot switch means is operated.

7. A digital data port for placing a symmetrical data eye on the summing bus of a PAM bus system including a distribution bus connectable to said summing bus over any of a plurality of paths exhibiting different DC offsets, said data port comprising switch means opening and closing in accordance with a digital data stream, a transmit and a receive operational amplifier, a transmit time slot switch operable to connect the output of said transmit operational amplifier to said summing bus and a receive time slot switch operable to connect an input of said receive operational amplifier to said distribution bus, voltage divider means connected between switch means and an input of said transmit operational amplifier, a clamping time slot switch operable prior to the operation of said transmit time slot switch for clamping said summing bus, and a compensating time slot switch operable during the time said clamping time slot switch is operated for connecting said distribution bus to another input of said receive operational amplifier.

8. A port for serving a line or a trunk appearing in a PAM bus switching system including a summing and a distribution bus connectable to each other over any of a plurality of different paths exhibiting different DC offsets, said port comprising
    switch means opening and closing in accordance with a digital data stream,
    a transmit and a receive operational amplifier,
    transmit time slot switch means operable to connect the output of said transmit operational amplifier to said summing bus,
    receive time slot switch means operable to connect an input of said receive operational amplifier to said distribution bus,
    side-tone suppression means connecting the output of said transmit operational amplifier to an inverting input of said receive operational amplifier,
    means for controlling said side-tone suppression means to present a first fraction of said transmit operational amplifier output to said inverting input of said receive operational amplifier when said port circuit is serving one of said trunks, and for controlling said side-tone suppression means to present a second fraction of said transmit operational amplifier output to said inverting input of said receive operational amplifier when said port circuit is serving one of said lines, a clamping time slot switch operable prior to the operation of said transmit time slot switch for clamping said summing bus, and a compensating time slot switch operable during the time said clamping time slot is operated for connecting said distribution bus to another input of said receive operational amplifier.

9. A port for serving a line or a trunk appearing in a PAM bus switching system including a summing and a distribution bus connectable to each other over any of a plurality of different paths exhibiting different DC offsets, said port comprising switch means opening and closing in accordance with a digital data stream, a transmit and a receive operational amplifier, a transmit time slot switch means operable to connect the output of said transmit operational amplifier to said summing bus, receive time slot switch means operable to connect an input of said receive operational amplifier to said distribution bus, clamping time slot switch means for connecting said summing bus to a reference potential during a portion of a time slot, sample and hold means, compensating time slot switch means for connecting said sample and hold means between said distribution bus and an inverting input of said receive operational amplifier, and means for causing said compensating time slot switch means to exhibit a first gain between said distribution bus and said receive amplifier input when said port is serving a line and a second gain when said port is serving said trunk.

* * * * *